United States Patent [19]

Rhoades

[11] 3,792,903
[45] Feb. 19, 1974

[54] URANIUM SOLUTION MINING PROCESS
[75] Inventor: Vaughan W. Rhoades, Tulsa, Okla.
[73] Assignees: Dalco Oil Company; United States Steel Corporation, ; part interest to each
[22] Filed: Aug. 30, 1971
[21] Appl. No.: 176,230

[52] U.S. Cl. .................................. 299/5, 23/312
[51] Int. Cl. ............................................ E21b 43/28
[58] Field of Search .................................. 299/4, 5

[56] References Cited
UNITED STATES PATENTS
2,896,930   7/1959   Menke ..................................... 299/5
3,309,141   3/1967   Fitch et al. .............................. 299/4

Primary Examiner—Ernest R. Purser
Attorney, Agent, or Firm—William L. Krayer

[57] ABSTRACT

An improved process wherein uranium is solution mined through the introduction of a first treated water solution into the uranium bearing formation in order to form a buffer zone about an injection well. Subsequent to buffer zone formation, uranium leaching solution, consisting essentially of an aqueous alkaline solution, is introduced into the formation so that it readily contacts the uranium formation, leaching uranium therefrom such that it is subsequently produced at the earth's surface without the formation of scale about the injection and production wells.

8 Claims, No Drawings

URANIUM SOLUTION MINING PROCESS

BACKGROUND OF THE INVENTION

The present invention relates to a process for the solution mining of uranium from subterranean formations. More particularly, the process of the present invention utilizes the introduction of a buffer solution of treated formation water into the uranium containing formation prior to aqueous alkaline solution introduction in order to avoid scale formation within the formation well.

Conventional solution mining processes for the dissolution of uranium deposits normally utilize an acid or alkaline solution which is added to the uranium deposit from an injection well. Simultaneously injected with the leaching solution is an oxidant, for example hydrogen peroxide, such that the acid or alkaline leaching solution utilized in conjunction with the oxidant transforms the uranium mineral deposit into a soluble salt. Uranium mineral is leached from the formation, deposited into the treating solution and subsequently produced from an offset production well. The production fluids are processed for the extraction of uranium therefrom with the spent leaching solution and oxidant being either reconstituted for reinjection into the formation or discarded.

The inherent problem of solution mining uranium utilizing an alkaline solution instead of an acid is incurred when the water contained within a formation has a high hard water cation concentration so that scale formation occurs about the injection well when the injected leaching solution contacts the hard water cation bearing formation water. For example, sodium carbonate solution injected into a formation mixes with the calcium bearing formation water to form calcium carbonate which precipitates about the injection well and decreases the efficiency of the uranium solution mining process by continuous decrease of the injectivity of the well. An identical problem occurs when the injected leaching solution arrives at the production well and mixes with native formation water so as to form a calcium carbonate precipitate about the wellbore, thereby restricting the production rate. Conventionally, the continued precipitation of calcium carbonate scale will result in complete plugging of the well. This damage is so severe that solution mining patterns, or the technique as utilized, must be abandoned. Therefore, what is required is a method by which uranium containing subterranean formations may be leached with alkaline leaching solutions while preventing precipitation of scale in the formation and the injection well.

It is an object of the present invention to provide a process for the solution mining of uranium from subterranean formations.

It is a further object of the present invention to provide a process for the solution mining of uranium through the use of alkaline leaching solutions.

It is still a further object of the present invention to provide a process for the solution mining of uranium deposits through the utilization of an alkaline leaching solution in combination with a first introduction of a treated water into the formation to provide a buffer zone about the injection well in order to prevent scale formation therein.

With these and other objects in mind the present invention may be more fully understood through the following discussion and description.

SUMMARY OF THE INVENTION

The objects of the present invention are accomplished through use of a process for the solution mining of subterranean uranium containing formations in which one or more injection and production wells are drilled and completed within the uranium formation; alkaline uranium leaching solution and oxidant are injected through the injection wells into the formation to dissolve uranium salts; and the spent leaching solution, oxidant and salts are produced from the production wells or converted injection wells. The improved process of the present invention comprises first introducing a treated water solution into the formation in order to form a buffer zone about the injection well which prevents contact of the leaching solution with the native formation water and the subsequent scale formation. In general, the alkaline solution utilized is an aqueous solution of one or more salts selected from the group consisting of ammonium carbonate, sodium carbonate and potassium carbonate with the treated water comprising produced formation water which has had the hard water cations removed therefrom. Typical oxidants which may be utilized in the present invention comprise those selected from the group consisting of air, oxygen, and hydrogen peroxide, and are generally introduced in ratios of from about 1:1 to about 1:10 volumes of leaching solution per volume of oxidant. The process may further comprise driving the leaching solution and oxidant through the formation by means of a drive medium.

DETAILED DESCRIPTION OF THE INVENTION

The present invention utilizes a fresh water or a native formation water having a small amount of sodium carbonate or other alkaline salts added to precipitate calcium or other hard water cations prior to introduction of the treated water into the formation in order to form a buffer zone about an injection well. The composition of the solution is tailored to contain no appreciable concentration of hard water cations or alkaline leaching solution that will result in the scale formation when the water contacts the native waters in the formation. Subsequent to the buffer solution injection, the sodium carbonate leaching solution, or other alkaline solution, is introduced into the formation so that it does not readily come in contact with hard water cations contained in the native formation, for example calcium, so as to avoid formation of a calcium carbonate supersaturated solution which forms the inherent scale previously exhibited by other uranium solution mining techniques.

Therefore, in the process of the present invention, the native water produced from the formation may be treated with a small amount of the leaching solution, for example sodium carbonate, in order to precipitate the hard ions, for example calcium, contained in the native water. The addition of leaching chemical to the water causes calcium carbonate precipitation so that calcium-free water is provided which will not cause further calcium carbonate precipitation when it is injected into the formation and contacts the subsequently injected leaching solution which is never exposed to the calcium bearing native formation water. The treated water then is reintroduced into the wellbore of the injection well in order to form the buffer zone about the injection well from which the uranium solution mining process may be initiated. Throughout the continuous uranium solution mining process the injection well remains clear of scale formation, for example calcium carbonate scale, thereby allowing for the efficient solution mining of the uranium deposit. In the application of the process of the present invention, the injection well may also subsequently be utilized as a production well to withdraw the uranium ladened fluid from the formation.

Therefore, the technique is composed of first an injection cycle which consists of injecting a predetermined volume of treated water that is tailored chemically so as not to cause scale precipitation when it contacts the native formation waters or a subsequently injected alkaline leaching solution. For example, sodium carbonate and an adequate oxidant, such as hydrogen peroxide, may then be injected to free the uranium from the formation. A production cycle consisting of withdrawing the injected solutions from either a converted injection well or a production well is initiated. During each cycle the alkaline leaching solution is kept separated from the native formation water by the spacer or buffer solution of treated water in order to prevent scale formation within the subterranean uranium bearing deposit and therefore provide an adequate means by which the deposit may be alkaline leached. Generally, the treated water may be prepared by adding sufficient leaching solution to a produced formation water in order to precipitate all the hard water ions from the water and leave no excess of unreacted leachant. Of course, in ion exchange resin treated water, "soft" or fresh water, when available, is preferred as the treated water.

In application of the invention disclosed herein, one utilizes a common oxidant, for example those selected from the group consisting of air, oxygen and hydrogen peroxide, to be injected as slugs intermittent to an alkaline leaching solution, for example an aqueous solution of a salt selected from the group consisting of sodium carbonate, ammonium carbonate, and potassium carbonate leaching solution so that an economic oxidant and leaching solution may be utilized for solution mining and recovery of uranium salts from subterranean uranium containing formations. The oxidant and uranium leaching solution form a treating solution within the formation that contacts the uranium mineral. The treating solution causes reaction with uranium minerals to form soluble uranium salts which are leached from the formation and dissolved within the treating solution. The treating solution is then subsequently produced from the formation for the production and recovery of uranium salts. The process of the present invention may be utilized in conjunction with any suitable uranium solution mining process, any pattern design of injection and production wells or the huff and puff technique utilizing an injection well subsequently as a production well may be applied. It is normally preferred that the injection and production wells be drilled in concentric patterns about each other with a single production well contained within the center of the pattern, for example a five-spot, or that the injection and production wells be drilled and offset in line patterns so as to form a line drive mechanism within the uranium formation. Generally, the distance between the injection and production wells will be from 20 to 500 feet, with particular depth, thickness, permeability, porosity, water saturation of the formation, and economic value of the uranium mineral contained therein being the engineering constraint upon which the design of the well patterns is based.

It has been found that the alkaline leaching solution should normally be utilized in combination with the oxygen so as to be introduced into the formation in ratios from about 1:1 to about 1:10 volumes of solution per volume of oxidant. In general, the treated water solution is first introduced into the formation in order to form a buffer zone about the injection well. The leaching solution injection prevents scale formation and is preferably introduced until its production ratio to that of native water production is about 50 percent. It is preferred that the treated water solution be introduced to form a zone of treated solution comprising approximately one-half the distance to which the uranium is to be solution mixed. The slug of oxidant leaching solution introduced into the formation may be driven through by a follow-up drive utilizing a drive medium. Preferred drive medium may be selected from the group consisting of air, water, flue gas and brine, or any suitable medium for displacing the slug, leaching solution, or oxidant in the formation.

Therefore, through utilization of the process of the present invention, a process for solution mining uranium is derived which provides a means by which adequate contacting and production of uranium salts from subterranean formations may be achieved through utilization of alkaline uranium leaching solutions without the formation of scale in the subterranean uranium containing formation.

The present invention has been described herein with reference to particular embodiments thereof. It will be appreciated, however, by those skilled in the art that various changes and modifications may be made without departing from the scope of the invention as set forth herein.

Therefore, I claim:

1. In a process for the solution mining of subterranean uranium containing formations in which one or more injection and production wells are drilled and completed within the uranium formation, alkaline uranium leaching solution and an oxidant are injected in ratios of from about 1:1 to about 1:10 volumes of leaching solutions per volume of oxidant through the injection wells into the formation to dissolve uranium salts therein, and the spent leaching solution, oxidant and dissolved salts are produced from the production wells; the improvement which comprises first introducing a treated hard water cation-free solution into the formation in order to form a buffer zone about the injection well which prevents scale formation upon subsequent leaching solution injection.

2. The process of claim 1 in which the treated water is introduced until it breaks through into the surrounding production wells.

3. The process of claim 1 in which the alkaline solution is an aqueous solution of one or more salts selected from the group consisting of ammonium carbonate, sodium carbonate and potassium carbonate.

4. The process of claim 1 in which the oxidant is selected from the group consisting of air, oxygen and hydrogen peroxide.

5. The process of claim 1 further comprising driving the leaching solution and oxidant through the formation with a drive medium.

6. In a process for the solution mining of subterranean uranium containing formations in which an injection well is drilled and completed within the uranium formation, alkaline uranium leaching solution and an oxidant in ratios of from about one to one to about one to ten volumes of leaching solution per volume of oxidant are injected through the injection well into the formation to dissolve uranium salts therein, injection is ceased and the spent leaching solution, oxidant and dissolved salts are produced from the previously utilized injection well; the improvement which comprises first introducing a treated hard water cation-free solution in a slug representing one-half of the volume of the deposit about the well to be solution mined into the formation in order to form a buffer zone about the injection well which prevents scale formation upon subsequent leaching solution injection.

7. The process of claim 6 in which the alkaline solution is an aqueous solution of one or more salts selected from the group consisting of ammonium carbonate, sodium carbonate and potassium carbonate.

8. The process of claim 7 in which the oxidant is selected from the group consisting of air, oxygen and hydrogen peroxide.

* * * * *